United States Patent
Zhang et al.

(10) Patent No.: US 9,667,999 B2
(45) Date of Patent: May 30, 2017

(54) METHOD AND SYSTEM FOR ENCODING VIDEO DATA

(75) Inventors: Bo Zhang, Westford, MA (US); Stephen Gordon, North Andover, MA (US); Andrew Adams, Westford, MA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 3902 days.

(21) Appl. No.: 11/113,733

(22) Filed: Apr. 25, 2005

(65) Prior Publication Data

US 2006/0239348 A1  Oct. 26, 2006

(51) Int. Cl.
*H04N 7/12* (2006.01)
*H04N 19/85* (2014.01)
*H04N 19/56* (2014.01)
*H04N 19/105* (2014.01)
*H04N 19/176* (2014.01)
*H04N 19/147* (2014.01)
*H04N 19/61* (2014.01)
*H04N 19/11* (2014.01)
*H04N 19/109* (2014.01)
*H04N 19/14* (2014.01)
*H04N 19/137* (2014.01)
*H04N 19/194* (2014.01)
*H04N 19/80* (2014.01)

(52) U.S. Cl.
CPC .......... *H04N 19/85* (2014.11); *H04N 19/105* (2014.11); *H04N 19/109* (2014.11); *H04N 19/11* (2014.11); *H04N 19/137* (2014.11); *H04N 19/14* (2014.11); *H04N 19/147* (2014.11); *H04N 19/176* (2014.11); *H04N 19/194* (2014.11); *H04N 19/56* (2014.11); *H04N 19/61* (2014.11); *H04N 19/80* (2014.11)

(58) Field of Classification Search
CPC ...... H04N 19/85; H04N 19/56; H04N 19/105; H04N 19/176; H04N 19/147; H04N 19/61; H04N 19/11; H04N 19/109; H04N 19/14; H04N 19/137; H04N 19/194; H04N 19/80
USPC ............ 375/240.12, 240.13, 240.14, 240.16, 375/240.03, 240.15; 382/236, 232, 234
See application file for complete search history.

(56) References Cited

U.S. PATENT DOCUMENTS

| | | | | |
|---|---|---|---|---|
| 5,231,484 A * | 7/1993 | Gonzales et al. | ........ | 375/240.04 |
| 5,488,419 A * | 1/1996 | Hui et al. | ................. | 375/240.17 |
| 5,724,100 A * | 3/1998 | Kuchibhotla | ............ | 375/240.24 |
| 5,731,835 A * | 3/1998 | Kuchibholta | ............... | 348/390.1 |
| 5,764,803 A * | 6/1998 | Jacquin et al. | ............... | 382/236 |
| 5,987,180 A * | 11/1999 | Reitmeier | ..................... | 382/236 |
| 6,064,450 A * | 5/2000 | Canfield et al. | ......... | 375/240.29 |
| 6,208,692 B1 * | 3/2001 | Song et al. | ............. | 375/240.19 |
| 6,351,494 B1 * | 2/2002 | Kondo et al. | ............. | 375/240.27 |
| 6,414,992 B1 * | 7/2002 | Sriram et al. | ............. | 375/240.13 |

(Continued)

*Primary Examiner* — Tung Vo
(74) *Attorney, Agent, or Firm* — Foley & Lardner LLP

(57) ABSTRACT

Described herein is a method and system for encoding video data. The design comprises a two pass encoding system with bi-direction control to and from a classification engine. In the first pass coder, a future picture is encoded to produce a set of parameters that characterize the future picture. In the second pass coder a current picture is encoded to produce a video output. The classification engine is the center of perceptual enhancement. The classification engine interprets the set of parameters from the first pass coder and classifies the current picture.

17 Claims, 8 Drawing Sheets

(56) References Cited

U.S. PATENT DOCUMENTS

| | | |
|---|---|---|
| 6,434,196 B1 * | 8/2002 | Sethuraman et al. ... 375/240.12 |
| 6,560,371 B1 * | 5/2003 | Song et al. .................. 382/240 |
| 6,677,868 B2 * | 1/2004 | Kerofsky et al. ............. 341/107 |
| 6,748,113 B1 * | 6/2004 | Kondo et al. ................. 382/232 |
| 7,010,040 B2 * | 3/2006 | Kim ......................... 375/240.16 |
| 7,068,722 B2 * | 6/2006 | Wells ....................... 375/240.16 |
| 7,336,720 B2 * | 2/2008 | Martemyanov et al. 375/240.12 |
| 7,403,562 B2 * | 7/2008 | Yang et al. ............... 375/240.03 |
| 7,412,002 B2 * | 8/2008 | Koshiba et al. ......... 375/240.16 |

* cited by examiner

METHOD AND SYSTEM FOR ENCODING VIDEO DATA

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video communications systems are continually being enhanced to meet needs such as reduced cost, reduced size, improved quality of service, increased data rate, and backward compatibility. The ITU-T Video Coding Experts Group (VCEG) and the ISO/IEC Moving Picture Experts Group (MPEG) have drafted a video coding standard titled ITU-T Recommendation H.264 and ISO/IEC MPEG-4 Advanced Video Coding. H.264 includes spatial prediction, temporal prediction, transformation, interlaced coding, and lossless entropy coding. The design of an H.264 compliant video encoder is not included in the standard.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for encoding video data, substantially as shown in and/or described in connection with at least one of the figures, as set forth more completely in the claims.

These and other advantages and novel features of the present invention will be more fully understood from the following description.

DETAILED DESCRIPTION OF THE INVENTION

According to certain aspects of the present invention, a system and method for encoding video data are presented.
H.264 Video Coding Standard The ITU-T Video Coding Experts Group (VCEG) and the ISO/IEC Moving Picture Experts Group (MPEG) drafted a video coding standard titled ITU-T Recommendation H.264 and ISO/IEC MPEG-4 Advanced Video Coding. In the H.264 standard, video is encoded on a macroblock-by-macroblock basis.

The specific algorithms used for video encoding and compression form a video-coding layer VCL, and the protocol for transmitting the VCL is called the Network Access Layer (NAL). The H.264 standard allows a clean interface between the signal processing technology of the VCL and the transport-oriented mechanisms of the NAL, so no source-based encoding is necessary in networks that may employ multiple standards.

Using the MPEG compression standards, video is compressed while preserving image quality through a combination of spatial, temporal, and spectral compression techniques. To achieve a given Quality of Service (QoS) within a small data bandwidth, video compression systems exploit the redundancies in video sources to de-correlate spatial, temporal, and spectral sample dependencies. Statistical redundancies that remain embedded in the video stream are distinguished through higher order correlations via entropy coders. Advanced entropy coders can take advantage of context modeling to adapt to changes in the source and achieve better compaction.

Figure 1:
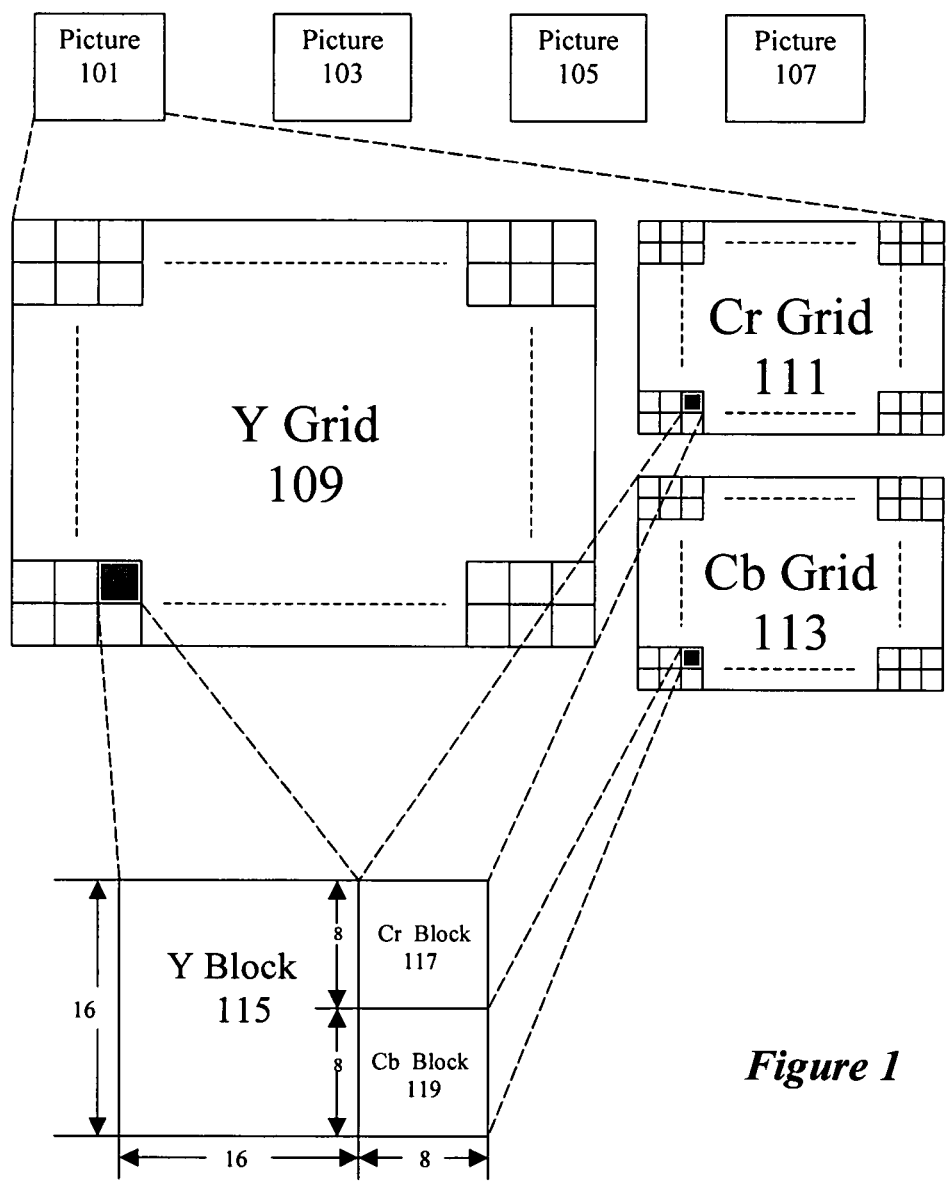
FIG. 1 is a block diagram of an exemplary picture in the H.264 coding standard in accordance with an embodiment of the present invention.

Referring now to FIG. 1, there is illustrated a block diagram of an exemplary picture 101. The picture 101 along with successive pictures 103, 105, and 107 form a video sequence. The picture 101 comprises two-dimensional grid(s) of pixels. For color video, each color component is associated with a unique two-dimensional grid of pixels. For example, a picture can include luma, chroma red, and chroma blue components. Accordingly, these components are associated with a luma grid 109, a chroma red grid 111, and a chroma blue grid 113. When the grids 109, 111, 113 are overlayed on a display device, the result is a picture of the field of view at the duration that the picture was captured.

Generally, the human eye is more perceptive to the luma characteristics of video, compared to the chroma red and chroma blue characteristics. Accordingly, there are more pixels in the luma grid 109 compared to the chroma red grid 111 and the chroma blue grid 113. In the MPEG 4:2:0 standard, the chroma red grid 111 and the chroma blue grid 113 have half as many pixels as the luma grid 109 in each direction. Therefore, the chroma red grid 111 and the chroma blue grid 113 each have one quarter as many total pixels as the luma grid 109.

The luma grid 109 can be divided into 16×16 pixel blocks. For a luma block 115, there is a corresponding 8×8 chroma red block 117 in the chroma red grid 111 and a corresponding 8×8 chroma blue block 119 in the chroma blue grid 113. Blocks 115, 117, and 119 are collectively known as a macroblock that can be part of a slice group. Currently, 4:2:0 subsampling is the only color space used in the H.264 specification. This means, a macroblock consist of a 16×16 luminance block 115 and two (subsampled) 8×8 chrominance blocks 117 and 118.

Spatial prediction computes samples based on a carefully weighted average of neighboring samples. The computation is divided into 4×4 partitions of samples. There are 16 of these partitions per macroblock. Each macroblock is 16×16 (256) samples. All 256 samples are predicted by a spatial prediction 16 samples at a time.

Figure 2:
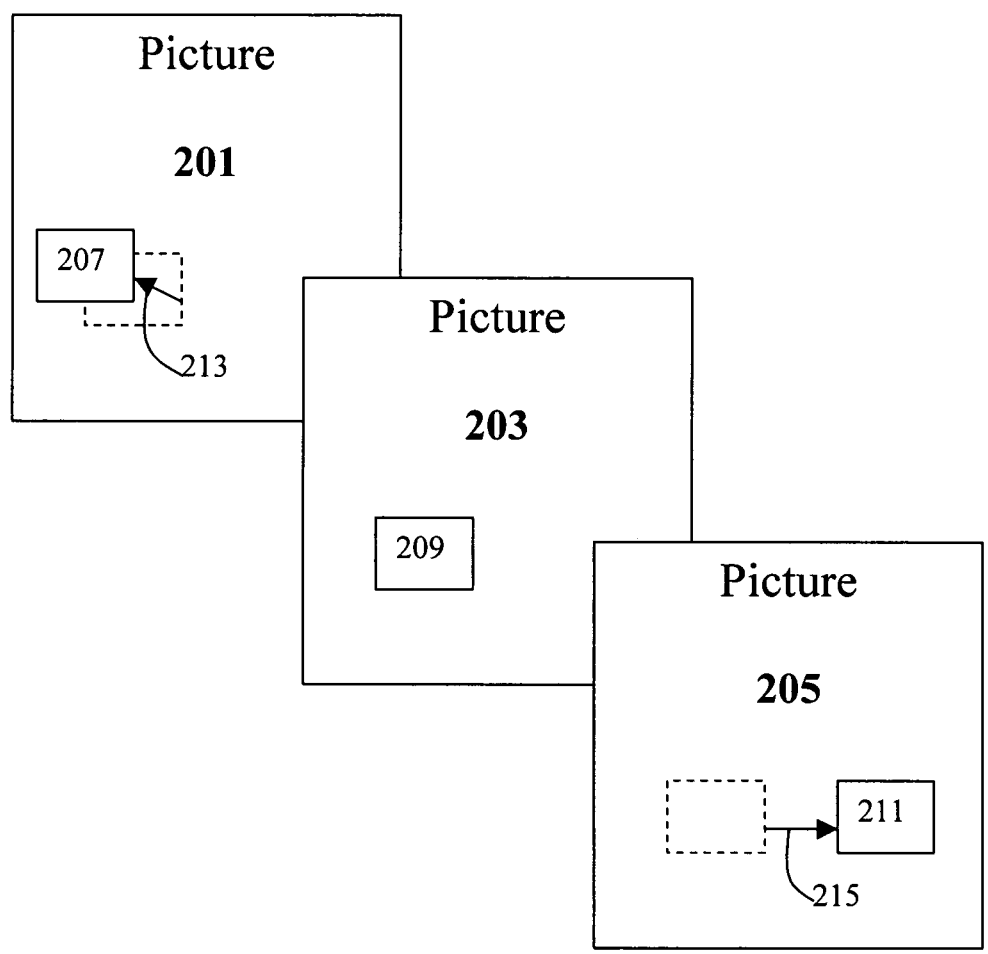
FIG. 2 is a block diagram describing temporally encoded macroblocks in accordance with an embodiment of the present invention.

Referring now to FIG. 2, there is illustrated a block diagram describing temporally encoded macroblocks. In bi-directional coding, a current partition 209 in the current picture 203 is predicted from a reference partition 207 in a previous picture 201 and a reference partition 211 in a latter arriving picture 205. Accordingly, a prediction error is calculated as the difference between the weighted average of the reference partitions 207 and 211 and the current partition 209. The prediction error and an identification of the prediction partitions are encoded. Motion vectors 213 and 215 identify the prediction partitions.

The weights can also be encoded explicitly, or implied from an identification of the picture containing the prediction partitions. The weights can be implied from the distance between the pictures containing the prediction partitions and the picture containing the partition.

Figure 3:
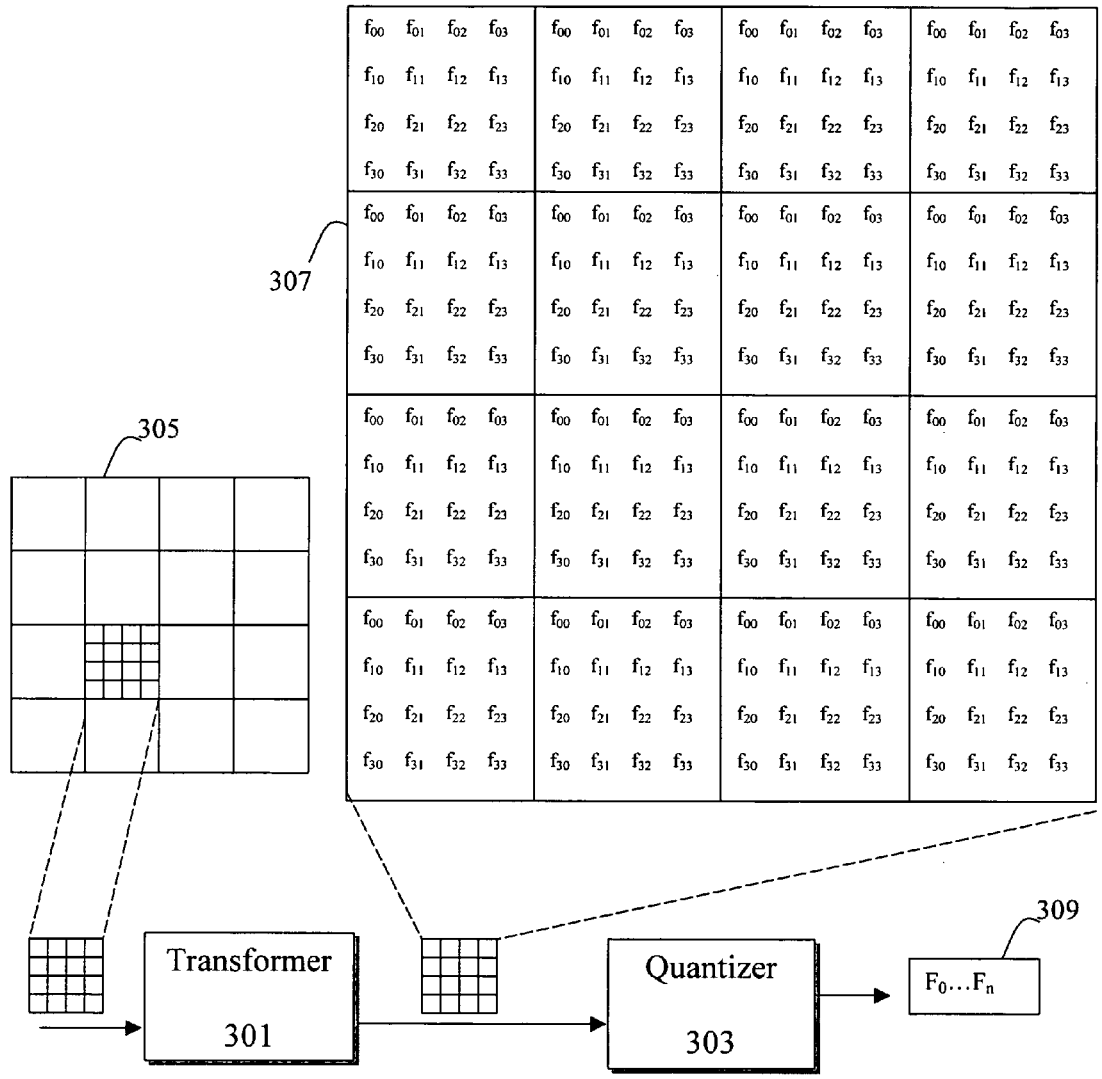
FIG. 3 is a block diagram describing the transformation and quantization of a prediction in accordance with an embodiment of the present invention.

Referring now to FIG. 3, there is illustrated a block diagram describing the transformation and quantization of the prediction parameters. A macroblock is encoded as the combination of its partitions. A macroblock is represented by an error for both spatial prediction and temporal prediction. The prediction error is also a two-dimensional grid of pixel values for the luma Y, chroma red Cr, and chroma blue Cb components with the same dimensions as the macroblock.

The transformer 301 transforms 4×4 partitions of the prediction parameters 305 to the frequency domain, thereby resulting in corresponding sets of frequency coefficients 307. The sets of frequency coefficients 307 are then passed to a quantizer 303, resulting in set of quantized frequency coefficients, $F_0 \ldots F_n$ 309. The quantizer 309 can be programmed with one of the variable quantization levels.

Figure 4:
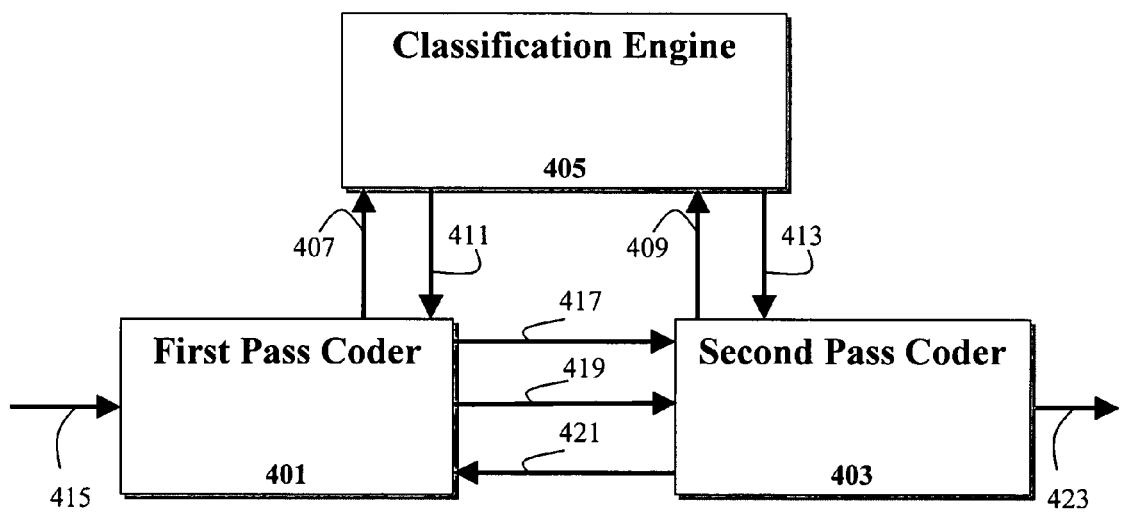
FIG. 4 is a block diagram of an exemplary video encoding system in accordance with an embodiment of the present invention.

In FIG. 4 a block diagram of a video encoding system 400 is presented. The video encoding system 400 comprises a first pass coder 401, a second pass coder 403, and a classification engine 405. The classification engine 405 is the central processor for perceptual enhancement.

Classification Engine

The classification engine 405 collects first pass statistics 407 and second pass statistics 409. Based on these statistics 407 and 409, the classification engine 405 provides first pass control 411 and second pass control 413 for complexity-based biasing of the encoding process. Based on the content of a picture and/or macroblock (as classified by the statistics 407 and 409) the classification engine 405 can modulate the quantization level assignment, and bias towards certain prediction modes.

In certain embodiments of the present invention, the classification engine can comprise the system(s), method(s), or apparatus described in METHOD AND SYSTEM FOR RATE CONTROL IN A VIDEO ENCODER, Attorney Docket No. 16505US01, filed Apr. 25, 2005 by Koul et al., and incorporated herein by reference for all purposes.

The first pass coder 401 will operate on video data 415 ahead of the second pass coder 403. For example in a low latency mode, the first pass coder 401 can process video data 415 in macroblocks one row prior to the second pass coder 403, and in a typical processing mode, this delay could be as much as one entire picture.

Figure 5:
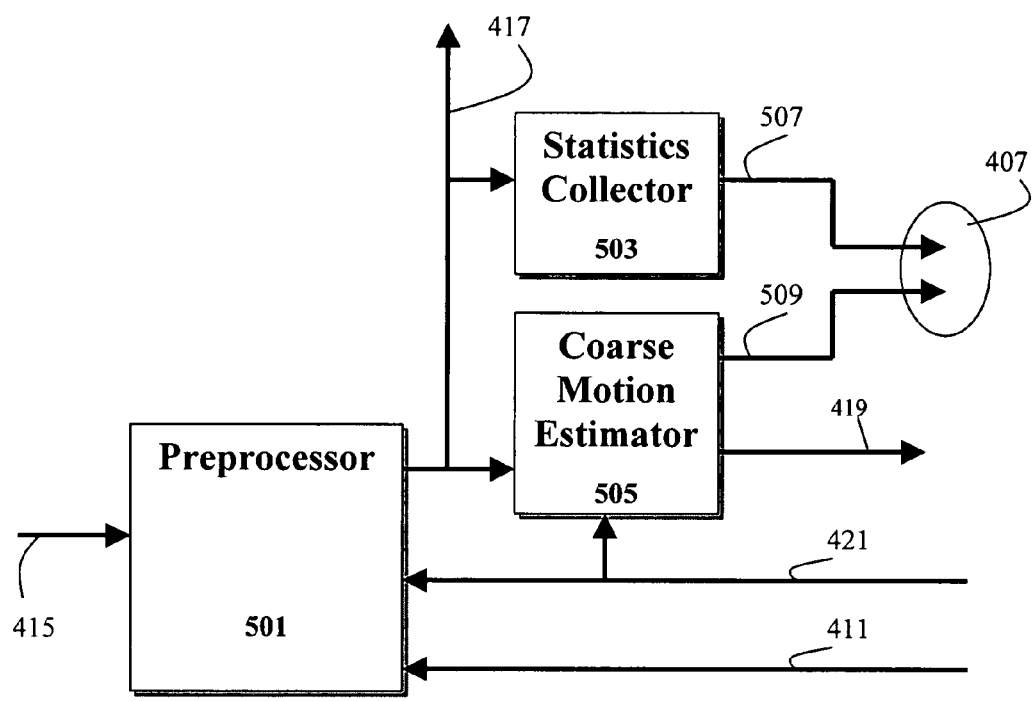
FIG. 5 is a block diagram of an exemplary first pass coder in accordance with an embodiment of the present invention.

The inputs 415, 411, 421 and outputs 407, 417, 419 are described in reference to the detailed block diagram of the first pass coder 401 shown in FIG. 5. The first pass coder 401 comprises a preprocessor 501, a statistics collector 503, and a coarse motion estimator 505.

Preprocessing

The preprocessor receives the video data 415 and can perform spatial filtering, temporal filtering, and prediction weight determination. These processes are adapted based on data rate control 421 and classification 411.

Statistics Collection

The statistics collector 503 receives the preprocessed video data 417, measures spatial activity and field correlation, and detects a scene change. These parameters 507 are passed to the classification engine 405 in FIG. 4.

Coarse Motion Estimation (CME)

Figure 6:
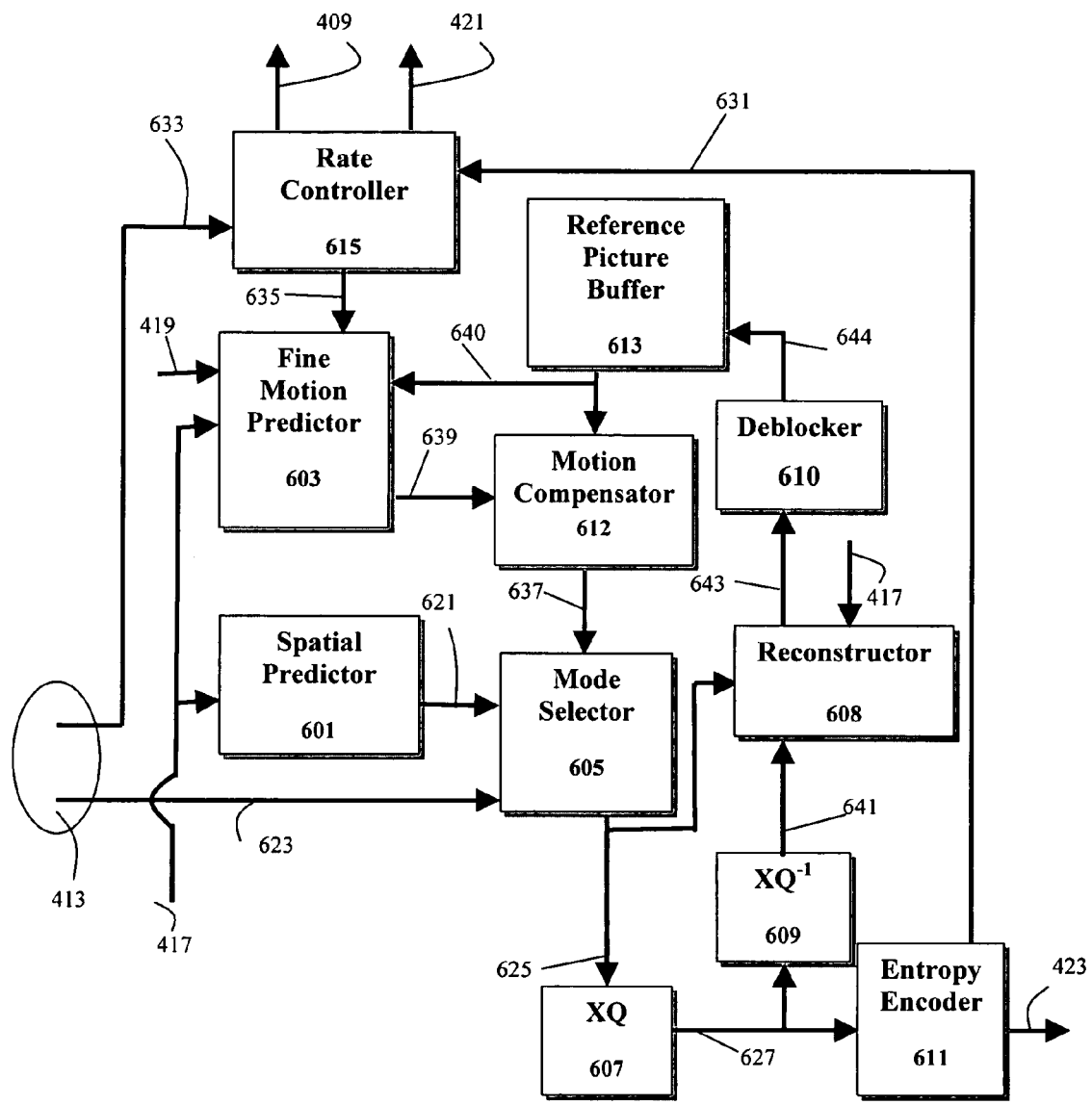
FIG. 6 is a block diagram of an exemplary second pass coder in accordance with an embodiment of the present invention.

The coarse motion estimator 505 receives the preprocessed video data 417. For each macroblock in the picture to be encoded, the coarse motion estimator 505 performs a first order evaluation of the likelihood that one or more previously received original pictures can be used as a reference picture to predict the current macroblock. Parameters 509 associated with this evaluation are passed to the classification engine 405 in FIG. 4. Coarse motion vectors 419 are passed to a fine motion predictor 603 in FIG. 6 where a block diagram of an exemplary second pass coder is presented. The encoding processes in the second pass coder comprise the final coding of the video data.

Spatial Prediction

Spatial prediction is based only on content of the current picture. The spatial predictor 601 receives the preprocessed video 417 producing a set of spatial prediction residuals and the associated modes 621.

Figure 7:
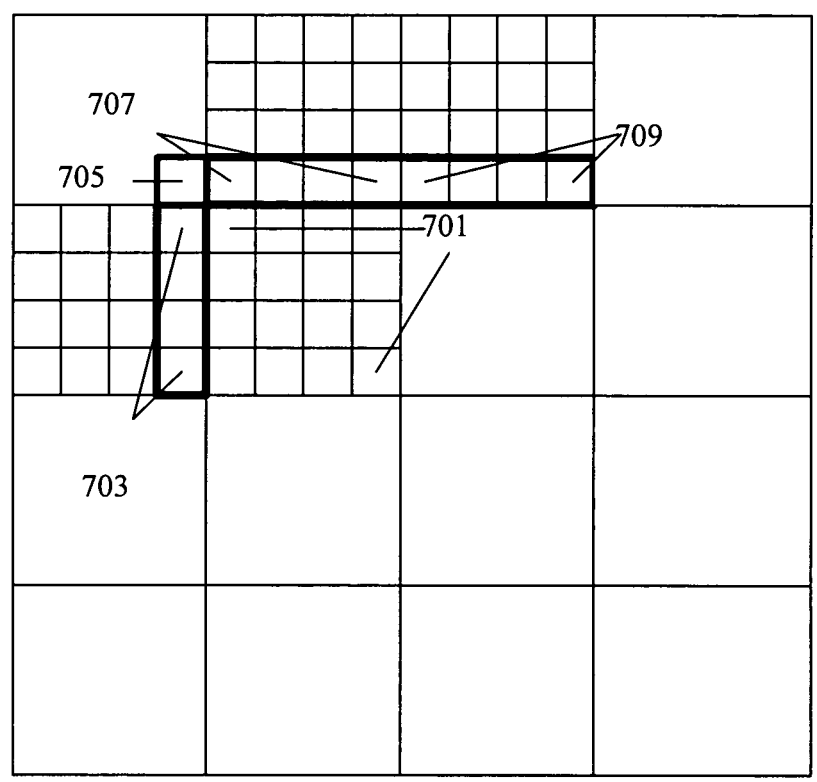
FIG. 7 is a block diagram describing spatially encoded macroblocks in accordance with an embodiment of the present invention.

Referring now to FIG. 7, there is illustrated a block diagram describing spatially encoded macroblocks. Spatial prediction, also referred to as intra prediction, involves prediction of picture pixels from neighboring pixels. The pixels of a macroblock can be predicted, in a 16×16 mode, an 8×8 mode, or a 4×4 mode. A macroblock is encoded as the combination of the prediction errors and the associated prediction modes.

In the 4×4 mode, a macroblock 701 is divided into 4×4 partitions. The 4×4 partitions of the macroblock 701 are predicted from a combination of left edge partitions 703, a corner partition 705, top edge partitions 707, and top right partitions 709. The difference between the macroblock 701 and prediction pixels derived from the partitions 703, 705, 707, and 709 is known as the prediction error. The prediction error is encoded along with the prediction mode.

In the 16×16 mode, a macroblock is predicted using a 16×16 partition size based on the neighboring 33 edge samples. There are 4 prediction modes, Chroma is also spatially predicted this way with an 8×8 macroblock partition size.

In all spatial predictions, SATD costing is used to determine the best mode to use. In 4×4 prediction, each of the 9 modes is costed for each of the 4×4 partitions and the best mode is chosen. In 16×16 mode, the entire macroblock is costed to determine the best mode. The SATD values are stored and made available to the mode decision.

Fine Motion Estimation (FME)

The fine motion predictor 603 performs motion search refinement of the coarse motion vectors 419 for all partition modes and all partitions, across multiple reference pictures 640 and multiple candidates. It then decides the best partition mode (e.g. 16×16, 16×8, 8×16, 8×8, etc.), the best prediction modes (e.g. unidirectional prediction or bidirectional prediction), and the best reference picture(s) for each macroblock partition. The set of motion vectors 639 and associated reference picture indices are passed to the motion compensator 612 for final evaluation.

The fine motion predictor 603 performs motion search refinement around multiple candidate motion vectors. The candidate motion vectors are derived from the Coarse Motion Estimation results in a non-causal way. Unlike Coarse motion search, Fine Motion Estimation refines motion vectors for all partition modes and all partitions.

In certain embodiments of the present invention, the motion estimation can comprise the system(s), method(s), or apparatus described in METHOD AND SYSTEM FOR MOTION ESTIMATION IN A VIDEO ENCODER, Attorney Docket No. 16284US01, filed Apr. 1, 2005 by Zhang et al., and incorporated herein by reference for all purposes.

Motion Compensation (MC)

The motion compensator 612 receives the motion vectors 639 and a buffered reconstructed picture 640 and generates a temporal prediction 637 that may include skip/direct mode prediction.

The encoding process requires a Motion Compensation function to produce the motion prediction residuals to be coded for P and B frames. The MC takes the set of motion vectors and reference indexes from the FME and performs quarter pel computation on the macroblock. Reference data is fetched from picture buffer according to the partition vectors and indexes. The macroblock prediction residuals are computed and costed using SATD costing. The residuals and cost values are stored for later use.

Mode Decision

The mode selector 605 receives the temporal prediction 637, the spatial prediction 621, and a classification 623. The mode selector 605 will preferably select the prediction mode according to a Lagrange rate-distortion optimization criterion that is based on the encoded rate and distortion for each block and each prediction mode. This method of mode selection is achieved by accessing stored rate distortion tables. These tables may be adapted over time. Alternatively, the prediction mode selected will minimize cost based on a sum of absolute transformed difference (SATD) of the prediction errors biased by the cost of coding the prediction modes.

Using SATD costing to compare the spatial prediction modes to the motion estimation modes, the best predition mode is chosen to be coded for the macroblock. The mode decision choses between the following prediction modes:

1. 4×4 Intra prediction
2. 16×16 Intra Prediction
3. Inter with best Motion Vectors
4. Inter with Skip/Direct Motion Vectors Transform and Quantization Once the mode is selected, the corresponding prediction is subtracted from the preprocessed picture 417 to produce a prediction error 625 that is sent to the transformer/quantizer (XQ) 607. The prediction error 625 is then transformed and quantized.

Integer transforms are used that approximate Discrete Cosine Transforms (DCT) and allow for a bit-exact specification. The prediction error is transformed independently of the block mode by means of a low-complexity 4×4 integer transform that together with an appropriate scaling in the quantization stage, approximates the 4×4 DCT. The transform is applied in both horizontal and vertical direction.

A selected quantizer level then quantizes the transformed values. There may be a total of 52 quantizer levels. Quantization may include Frequency-based Rounding, wherein a frequency with low perceptual value will be more likely to be rounded or clipped.

The quantized transform coefficients 627 are fed into an inverse quantizer/transformer ($XQ^{-1}$) 609 in order to regenerate the residual error 641. This residual error 641 is added 642 to the prediction 643 that was selected by the mode selector 605. The regenerated picture 628 is passed through a deblocker 610 to filter blocking effects. The reconstructed picture 629 is stored in a reference picture buffer 613 to be used as reference data for other frames.

Reconstructor

The reconstructor 608 generates the reconstructed reference data (Recon) 643 based on the inverse transformed results (R') 641, the prediction residuals (R) 625, and the current macroblock data (CMB) 417. Since the reconstructor 608 can compute the reconstructed data 643 using the prediction residuals (R) 625, the storage of prediction data (P) in the encoder is not required. The following shows a method that can be used for generating the reconstructed reference data (Recon) 643:

$$\text{Recon}=P+R'$$

$$R=\text{CMB}-P$$

$$P=\text{CMB}-R$$

$$\text{Recon}=(\text{CMB}-R)+R'$$

$$\text{Recon}=\text{CMB}+(R'-R)$$

The above method allows the encoder to store and carry the prediction residuals (R) 625 through the encoding process, and the actual predictions can be discarded. The difference (R'−R) between the inverse transformed results (R') 641 and the prediction residuals (R) 625 can be computed and used with CMB 417 data to form the reconstructed data 643.

Deblocker

The deblocker 610 is used to filter the edges of the macroblock data from the reconstructor 608. The deblocker 610 reads samples from previously encoded neighboring macroblocks 643 to perform the filtering. The resulting data 644 is then stored in picture buffer to be used as the reference data 640 for other frames to be encoded.

Entropy Coding

MPEG-4 specifies two more complex types of entropy coding: Context-based Adaptive Binary Arithmetic Coding (CABAC) and Context-based Adaptive Variable-Length Coding (CAVLC). CABAC produces the most efficient compression. CAVLC runs synchronously to the main encoding loop while CABAC runs asynchronously to the main encoding loop.

An entropy encoder 611 receives the quantized transform coefficients 627 and scans them in a zigzag manner prior to entropy encoding and generating a compressed video bitstream 423.

CABAC includes Binarization, Context Model Selection, Arithmetic Encoding, and Context Model Updating. Quantized transform coefficients 627 are reduced in range to create symbols of one's and zeros for each input value. Binarization converts non-binary-valued symbols into binary codes prior to Arithmetic Encoding. The result of Binarization is called a bin string or bins. Context Model Selection is used to determine an accurate probability model for one or more bins of the bin string. The Context Modeler samples the input bins and assigns probability models based on a frequency of observed bins. This model may be chosen from a selection of available models depending on the statistics of recently coded data symbols. The Context Model stores the probability of each bin being "1" or "0". With Arithmetic Encoding each bin is encoded according to the selected context model. There are just two sub-ranges for each bin: corresponding to "0" and "1". A mapping engine utilizes the context model and assigns bits to input bins. Generated bits are to be embedded in an outgoing video stream 423. Context model updating is based on the actual coded value (e.g. if the bit value was "1", the frequency count of "1"s is increased). The same generated bits that are to be embedded in the outgoing video stream are fed back to context modeling to update probabilities of observed events.

In certain embodiments of the present invention, the entropy encoding can comprise the system(s), method(s), or apparatus described in SYSTEM AND METHOD FOR ACCELERATING ARITHMETIC DECODING OF VIDEO DATA, application Ser. No. 10/871,219, filed Jun. 18, 2004 by Reinhard Schumann, and incorporated herein by reference for all purposes.

Rate Control

Rate control loops are the feedback mechanisms that monitor and adjust bandwidth allocation. Rate control can stabilize spatial and temporal complexity based on bit allocation at the macroblock level, the picture level, or the group of pictures level.

Three rate control processing loops are used: one master rate control and two slave rate controls. The rate controller 615 receives a classification 633 and a measure of current bandwidth utilization 631. The current bandwidth utilization 631 is measured based on the number of bits (or estimated number of bits) in the video output 423.

The master rate control is a mid-encoder rate control that sends an output 409 to the main encoding loop by way of the classification engine. One slave rate control 635 aids the FME in the motion vectors decision, and the second slave rate control 421 enters the first pass coder 401 in FIG. 4. The second slave rate control 421 controls the preprocessor 501 and CME 505 in FIG. 5.

Figure 8:
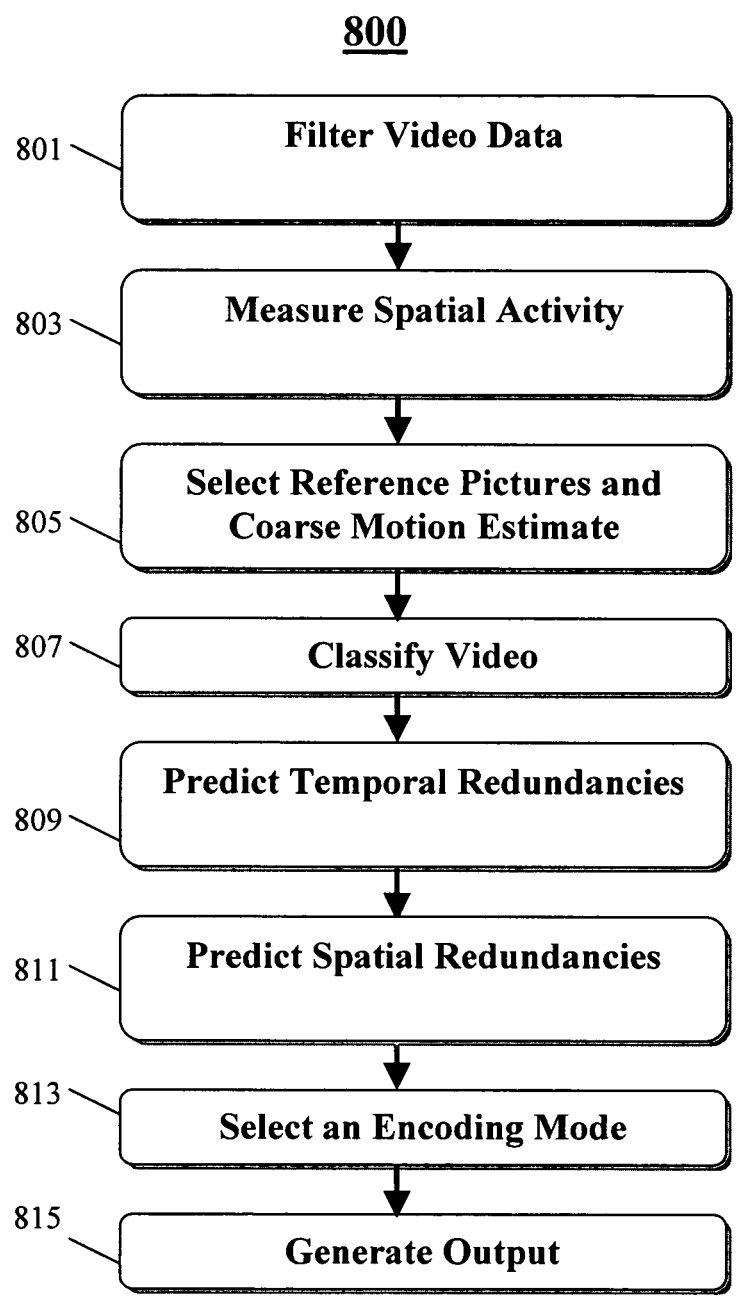
FIG. 8 is a flow diagram of an exemplary method for video encoding in accordance with an embodiment of the present invention.

FIG. 8 is a flow diagram of an exemplary method for video encoding in accordance with an embodiment of the present invention. The method comprises two-pass encoding with bi-direction control. In the first pass, filter video data 801, measure spatial activity and other statistics 803, and select reference pictures and coarse estimate motion 805. The filtered video data is a preprocessed picture that forms a basis for estimating and predicting motion. A preprocessor receives video data and can perform spatial filtering, temporal filtering, prediction weight determination, and field correlation. These processes may be implemented in an integrated circuit and are adapted based on data rate control and classification.

To classify video 807, statistics of the preprocessed picture are collected and sent to a classification engine that is the center of perceptual enhancement. Video classification is also based on rate control parameters that are generated from the video output.

In the second pass coder a current picture is encoded to produce a video output. The classification engine interprets the statistics and parameters from the first pass coder. This classification is used to predict temporal redundancies 809, predict spatial redundancies 811, and select an encoding mode 813. The predicted temporal redundancies predict motion in the current picture and also produce an estimate of the cost to encode the prediction.

To generate output 815, the prediction parameters of the selected mode of encoding are transformed, quantized, and entropy encoded.

The embodiments described herein may be implemented as a board level product, as a single chip, application specific integrated circuit (ASIC), or with varying levels of a video classification circuit integrated with other portions of the system as separate components. An integrated circuit may store a supplemental unit in memory and use an arithmetic logic to encode, detect, and format the video output.

The degree of integration of the video classification circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on MPEG-1 encoded video data, the invention can be applied to a video data encoded with a wide variety of standards.

Therefore, it is intended that the present invention not be limited to the particular embodiment disclosed, but that the present invention will include all embodiments falling within the scope of the appended claims.

The invention claimed is:

1. A method for video encoding a current block within a picture, comprising:
    encoding a picture to produce a set of parameters that characterize the picture;
    classifying the picture based on the set of parameters to produce a first picture classification; and
    encoding the picture according to the first picture classification to produce a video output,
    wherein the picture comprises a plurality of macroblocks,
    wherein the set of parameters that characterize the picture results from the encoding of a future macroblock in the picture, and
    wherein the video output results from the encoding of a current macroblock in the picture.

2. The method of claim 1, wherein encoding the picture to produce the set of parameters that characterize the picture further comprises:
    filtering the picture to produce a preprocessed picture;
    measuring spatial activity in the preprocessed picture; and
    selecting one or more reference pictures that predict motion relative to the preprocessed picture.

3. The method of claim 2, wherein a reference picture in the one or more reference pictures is generated from a set of prediction residuals.

4. The method of claim 1, wherein said method further comprises:

determining a rate control parameter based on the video output;

classifying the video output based on the rate control parameter to produce a second picture classification; and encoding another picture according to the first picture classification and the second picture classification.

5. A method for video encoding a current block within a picture, comprising:

encoding a picture to produce a set of parameters that characterize the picture;

classifying the picture based on the set of parameters to produce a first picture classification; and encoding the picture according to the first picture classification to produce a video output, wherein encoding the picture according to the first picture classification to produce the video output further comprises:

predicting spatial activity in the picture to produce a first prediction;

predicting motion in the picture to produce a second prediction; and selecting between the first prediction and the second prediction, based on the first picture classification.

6. A system for video encoding, said system comprising:

a coarse motion estimator to encode a picture, to produce a set of parameters that characterize the picture;

a classification engine to classify the picture based on the set of parameters, to produce a first picture classification;

a fine motion predictor to encode the picture according to the first picture classification, to produce a video output;

a spatial predictor to predict spatial activity in the picture, to produce a first prediction;

a fine motion predictor to predict motion in the picture, to produce a second prediction; and a mode selector to select between the first prediction and the second prediction, based on the first picture classification.

7. The system of claim 6, wherein the picture is a macroblock.

8. The system of claim 6, wherein the picture comprises a plurality of macroblocks.

9. The system of claim 6, wherein said system further comprises:

a filter to filter the picture, to produce a preprocessed picture; and a statistics collector to measure spatial activity in the preprocessed picture.

10. The system of claim 9, wherein the coarse motion estimator further selects one or more reference pictures that predict motion relative to the preprocessed picture.

11. The system of claim 6, wherein said system further comprises:

a rate controller to determine a rate control parameter based on the video output.

12. The system of claim 11, wherein the classification engine classifies the video output based on the rate control parameter to produce a second picture classification.

13. The system of claim 12, wherein said system further comprises:

encoding another picture according to the first picture classification and the second picture classification.

14. The system of claim 6, wherein the system encodes original lossless previous pictures with lossy encoding and wherein the coarse motion estimator motion estimates the picture from the original lossless previous pictures.

15. The system of claim 14, wherein the fine motion estimator motion estimates from reconstructed lossy encoded previous pictures.

16. The system of claim 14, wherein the coarse motion estimation uses only integer pixel offsets.

17. The system of claim 14, wherein the fine motion estimator uses fractional pixel offsets.

* * * * *